Sept. 22, 1953     R. SULLIVAN ET AL     2,652,590
APPARATUS FOR THE CONTINUOUS MILLING OF PLASTICS
Filed Sept. 9, 1950

INVENTOR.
A. Y. GLENDINNING.
L. M. READ.
BY R. SULLIVAN.

their ATTORNEYS.

UNITED STATES PATENT OFFICE 2,652,590

APPARATUS FOR THE CONTINUOUS MILLING OF PLASTICS

Robert Sullivan, Teddington, and Alexander Young Glendinning, Feltham, England, and Leonard Merrit Read, Llandaff, Cardiff, Wales, assignors to British Resin Products Limited, London, England, a British company Application September 9, 1950, Serial No. 183,926
In Great Britain September 14, 1949

2 Claims. (Cl. 18—2)

The present invention relates to the continuous milling of plastic compositions and has as one object the provision of an apparatus whereby a uniform mixture of the components of the composition can be produced continuously at a uniform speed and the duration of mixing controlled at will.

It has already been proposed, for example, as set forth in British Intelligence Objective Sub-Committee Report No. 1065, part V, pages 176–9 where the Raschig process is described, to add the pulverised constituents of a phenolic moulding powder continuously to the centre of the nip of a pair of rolls while continuously removing the rolled products from both extreme ends of the rolls simultaneously. In this process, so called plough-shaped knives of T iron section steel are mounted on a bar above the front roll (to which the plastic adheres) in contact with the plastic to improve the degree of mixing. No adequate provision is available for altering the duration of mixing, and the "flow" of the product is regulated by variation in the water added to the rolls which is not good practice and may result in variation of the water-content of the final moulding powder.

In the milling of moulding compositions as set forth in the above-mentioned report, with or without knives pressed into the material on the front roll to assist mixing and whether the feed is central or at one end of the rolls, it has been discovered that the product continuously stripped from the end of the roll is heterogeneous and contains a proportion of insufficiently mixed material which has a very detrimental effect on the quality of the final moulding powder, this material apparently traversing the nip without passing through it sufficiently frequently to be properly mixed and some not passing through at all. Furthermore, the rate of travel of the blanket along the front roll is not constant and the flow of the powdered product varies from time to time.

The invention accordingly comprises the novel apparatus and combinations thereof, specific embodiments of which are described herein by way of example only and in accordance with the manner in which we now prefer to practise the invention.

According to the present invention, a plastic composition is milled by feeding it continuously to a pair of milling rolls, constraining substantially the entire composition to pass at least once round the front roll by at least one partition fitted into and across the nip, and directing the composition revolving on the front roll towards a stripping zone and from the feed side to the stripping side of each partition by means of a plough knife.

The present invention also comprises an apparatus for continuously milling plastic compositions wherein a pair of milling rolls is provided with at least one partition adapted to extend into and across the nip between the upper surfaces of the rolls and with a plough knife associated with each partition, each knife being adapted to be pressed onto the upper surface of the front roll and to direct composition revolving thereon from one side of its associated partition to the other. Additional plough knives of the kind described may, if desired, be provided to assist and regulate the movement of the composition along the front roll, and it is preferred that the partitions and knives should be laterally adjustable.

The term "front roll" is used herein in its normal sense, to mean that roll to which the composition adheres in the course of milling operation, and the term "stripping zone" is used to mean the section of the roll from which the milled composition is removed, suitably by a doctor knife. It will be appreciated that more than one stripping zone may be employed in conjunction with one or more feeding zones, using suitably disposed partitions and plough knives; thus, the plastic composition may be fed centrally and stripped from each end of the front roll, although the end feeding and stripping system illustrated in the drawings is preferred.

One action of the partition in the nip of the rolls is to reduce greatly the lateral movement of the mix therein, thereby preventing insufficiently mixed or even completely unmixed material from travelling along the nip to the stripping end and compelling it to pass at least once round the roll, while the action of the plough knife is both to smoothen the movement of the mix, and to pass it in effect, across the partition. In this way, the partition and plough knife co-operate to regulate the duration of the mix on the roll and thereby, when adjustable, afford a convenient and effective way of regulating the flow of the final moulding powder, since lateral adjustment of the partition within the zone affected by the plough knife, or a corresponding adjustment of the position of the knife, will change the width of the strip passed over the partition and thereby change the rate of travel of the mix along the roll.

If desired, the partition and plough knife may be combined, to take the form of a partition, larger than would otherwise be necessary, fitted in a skew position in the nip and extending substantially to the top of the front roll. In this case, however, the flow-regulation by relative lateral adjustment of the partition and plough knife must be dispensed with.

For the purposes of illustration, one embodiment of the invention is shown in the accompanying drawings.

Figure 1:
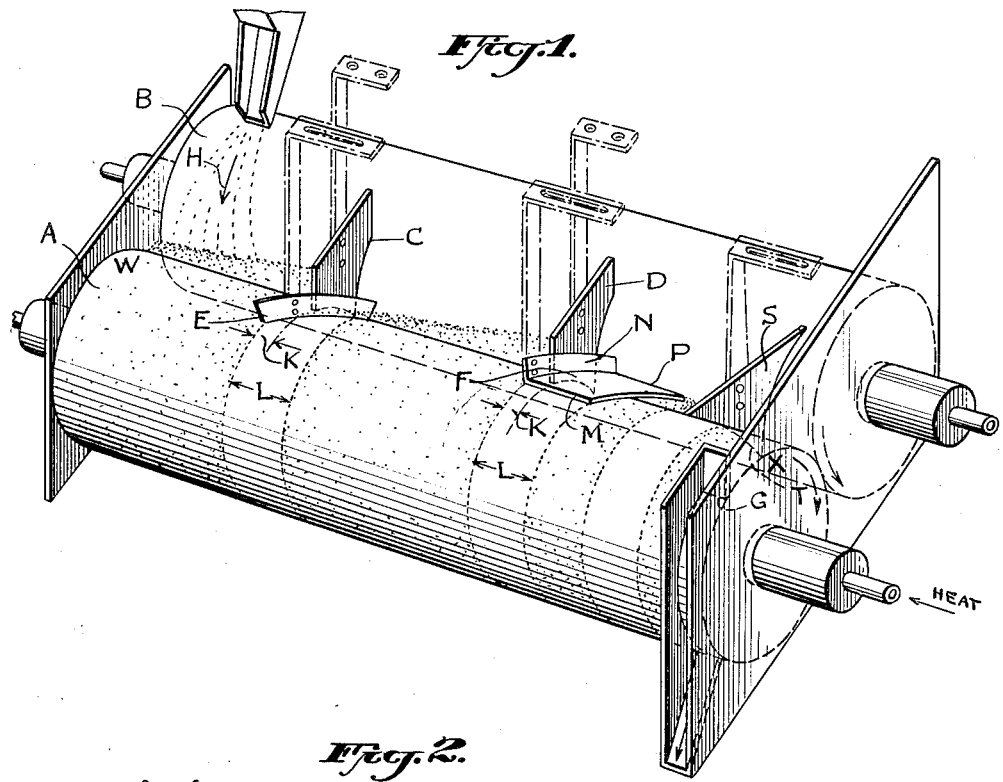
Figure 1 shows one embodiment of the invention in detailed perspective.
Figure 2:
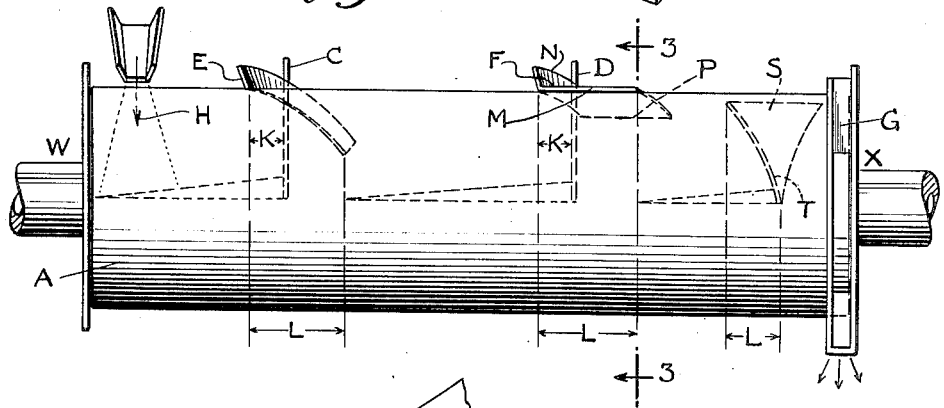
Figure 2 shows the embodiment of the invention in side elevation.
Figure 3:
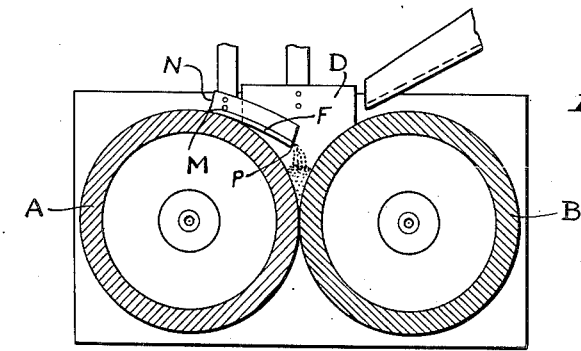
Figure 3 shows the embodiment of the invention in end elevation.

In the embodiment of the invention three types of plough knives are shown and it should be noted that in any given arrangement only one type of plough knife will normally be employed. The three types of plough knives have been shown in the one embodiment of the invention in the drawings merely for simplicity of illustration. In the figures the front and rear rolls A and B respectively are fitted with partitions C, D and S, two of whose sides substantially follow the circular contour of the rolls and extend into the nip. The partitions C and D are arranged with the plough knives E and F which contact the upper surface of roll A, while the partition S is fitted between the rolls in a skew position, the leading edge T of the partition S functioning as a plough knife, urging the composition revolving on the front roll A from the feeding end W to the stripping end X of the rolls, while any material passing along the nip, including any powder not yet having traversed roll A, is constrained to pass through the nip when it encounters the partition. Such material, having passed round the roll, then automatically comes to a position on the stripping side of the partition by virtue of the skew position in which the latter is fixed, and is pushed towards end X by the leading edge T acting as a plough knife.

The plough knife E is a relatively narrow blade which engages along its length with the surface of roll A, while the plough knife F is a wide blade, the broad blade M contacting the surface of roll A and a corresponding broad end P lifted away from the roll permitting partition D to pass underneath it, a shoulder N being provided along one side of the knife, if required, to prevent the cut-away strip of mix from spilling over the side.

The zones within which the plough knives E and F and the partition-plough knife S operate are shown at L in the drawings. With respect to the plough knives E and F, the width of the strip of mix which is in effect lifted from one side of the partition C or D to the other substantially corresponds to K, which latter can obviously be adjusted by altering the relative position of E to C and F to D, so long as C and D remain substantially within the zones L.

The cutting knife or doctor blade G is provided for continuously removing the product, and, in operation, powdered mix is continuously fed to the rolls at H. The partitions and plough knives depend from horizontal bars as shown in the drawings.

While this invention has been described principally in respect of its application to the production of mixes of moulding materials it is in no way limited thereto, and may also be employed, for example, in the continuous production of strips or sheets of a plastic material using calender rolls.

We claim:

1. An apparatus for continuously milling plastic compositions comprising a pair of milling rolls provided with at least one partition adapted to extend into and across the nip between the upper surfaces of the rolls in a skew position and to reach substantially to the top of the front roll.

2. An apparatus for continuously milling plastic compositions comprising a pair of milling rolls, at least one baffle disposed in a skew position with respect to the axis of said milling rolls, said baffle plate having an arcuate section fitted closely to the peripheral surface of said roller to prevent material carried on said roller from moving laterally past said baffle plate, said baffle plate being of dimensions to reach substantially to the top of the front roll.

ROBERT SULLIVAN.
ALEXANDER YOUNG GLENDINNING.
LEONARD MERRIT READ.

References Cited in the file of this patent

UNITED STATES PATENTS

| Number | Name | Date |
|---|---|---|
| 2,097,290 | Parkin | Oct. 26, 1937 |
| 2,319,040 | Conklin | May 11, 1943 |
| 2,341,651 | Raschig | Feb. 15, 1944 |
| 2,478,885 | Alvey | Aug. 9, 1949 |
| 2,534,291 | Moss | Dec. 19, 1950 |

FOREIGN PATENTS

| Number | Country | Date |
|---|---|---|
| 436,743 | Great Britain | Oct. 17, 1935 |